Aug. 19, 1969   R. J. PIOCH   3,462,033
DUMPING VEHICLE WITH DETACHABLE BODY MECHANISM
Filed Oct. 20, 1966   5 Sheets-Sheet 1
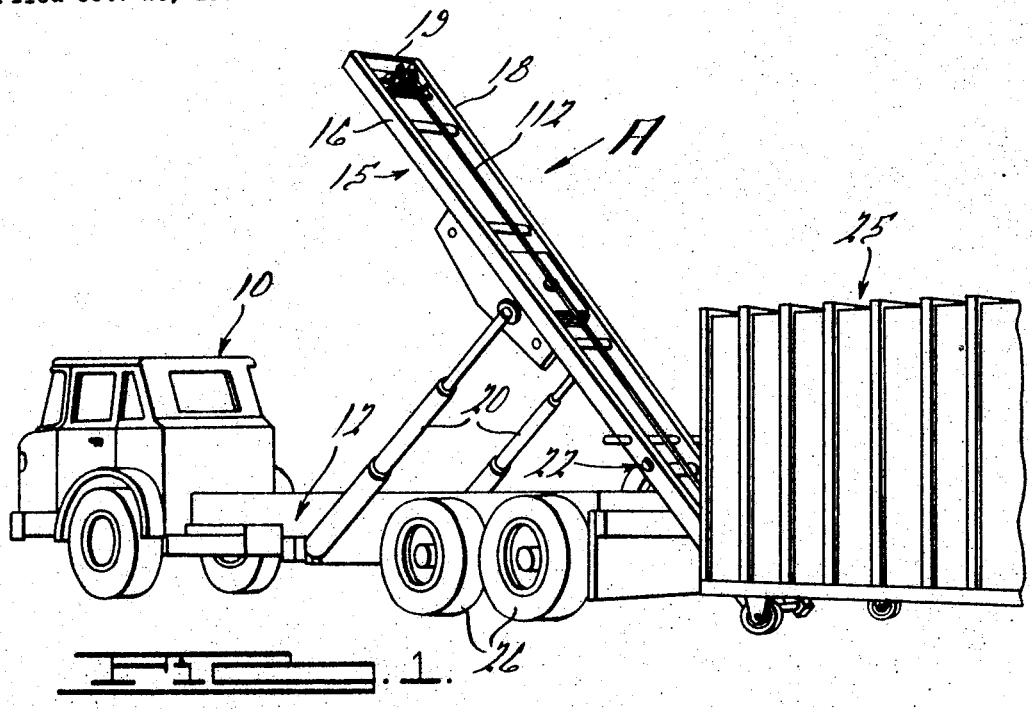
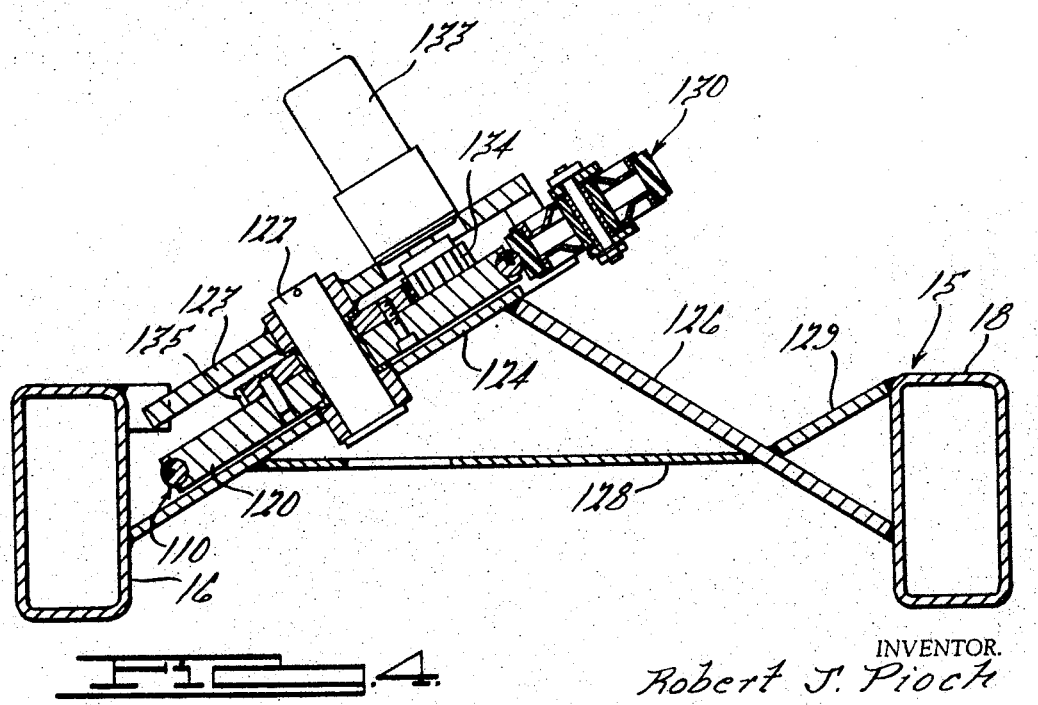
INVENTOR.
Robert J. Pioch
BY
Harness, Dickey & Pierce
ATTORNEYS.

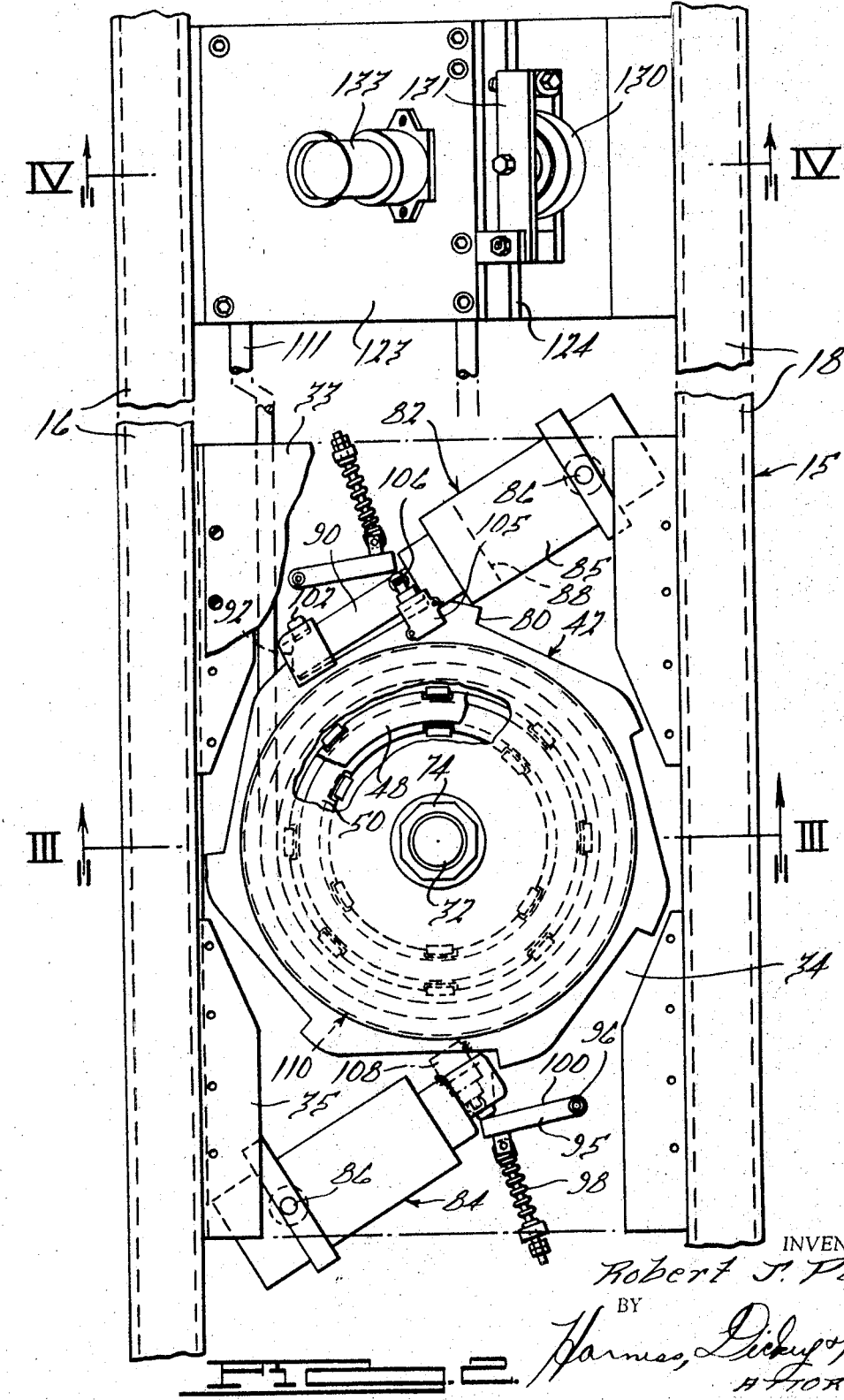

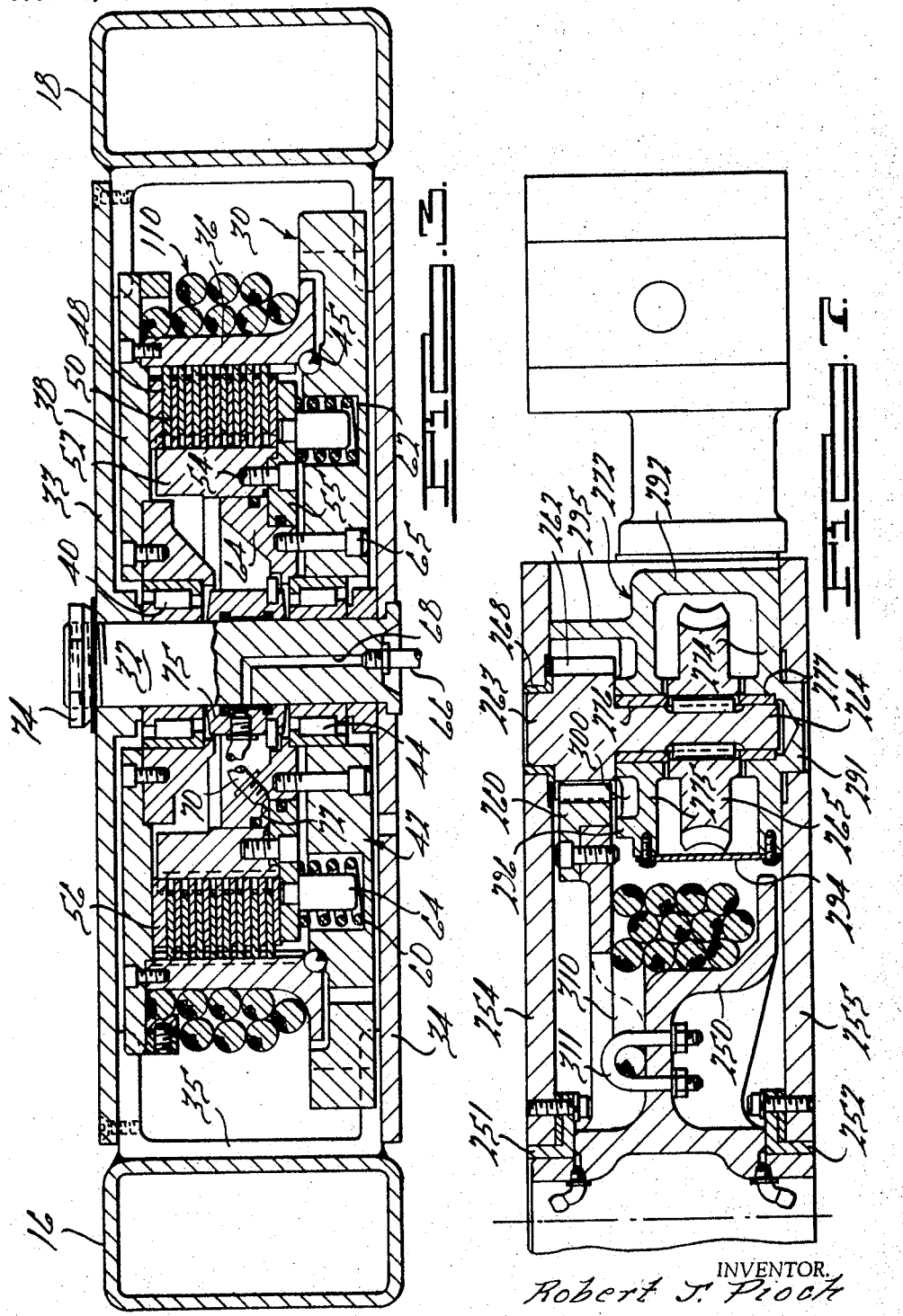

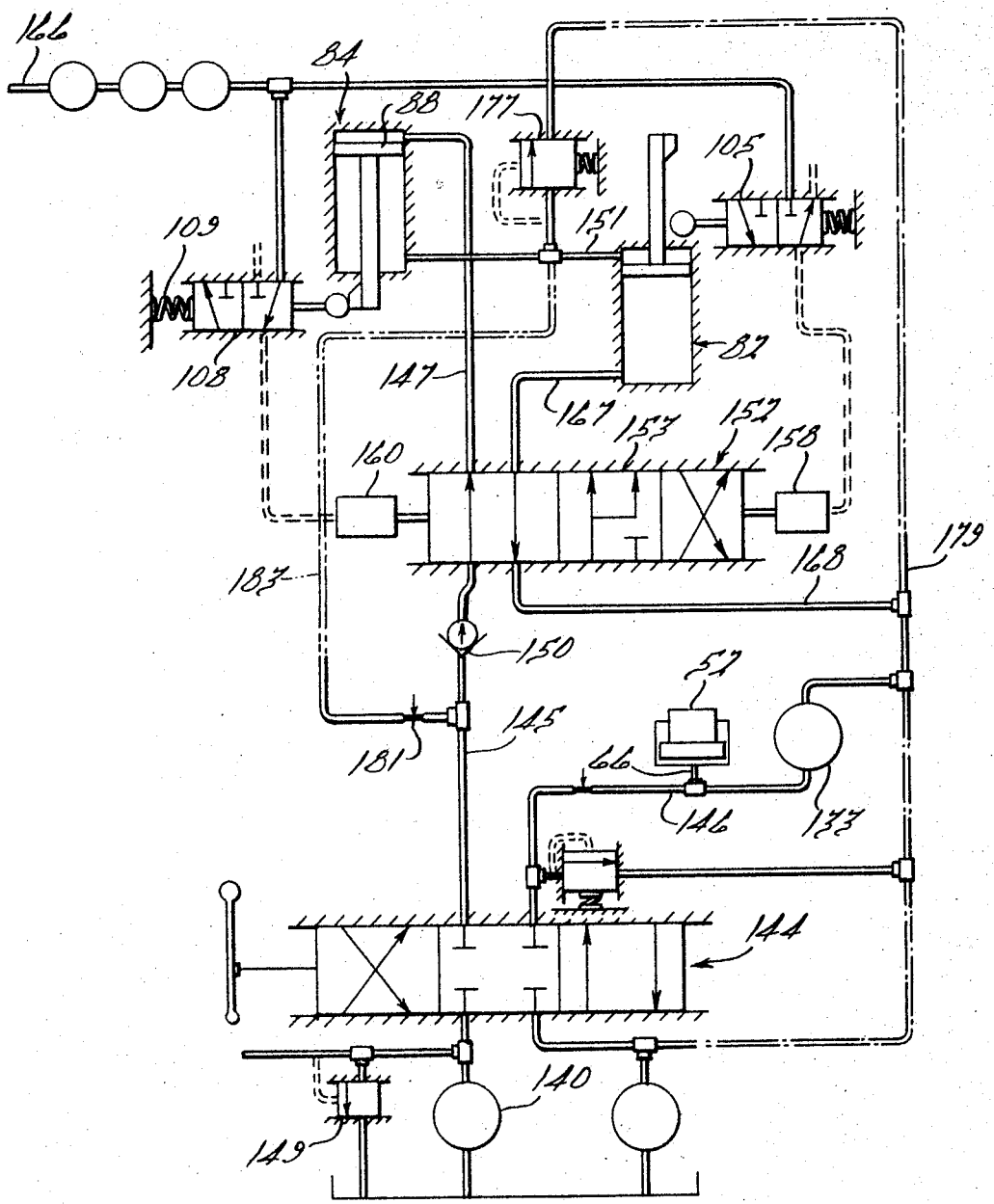

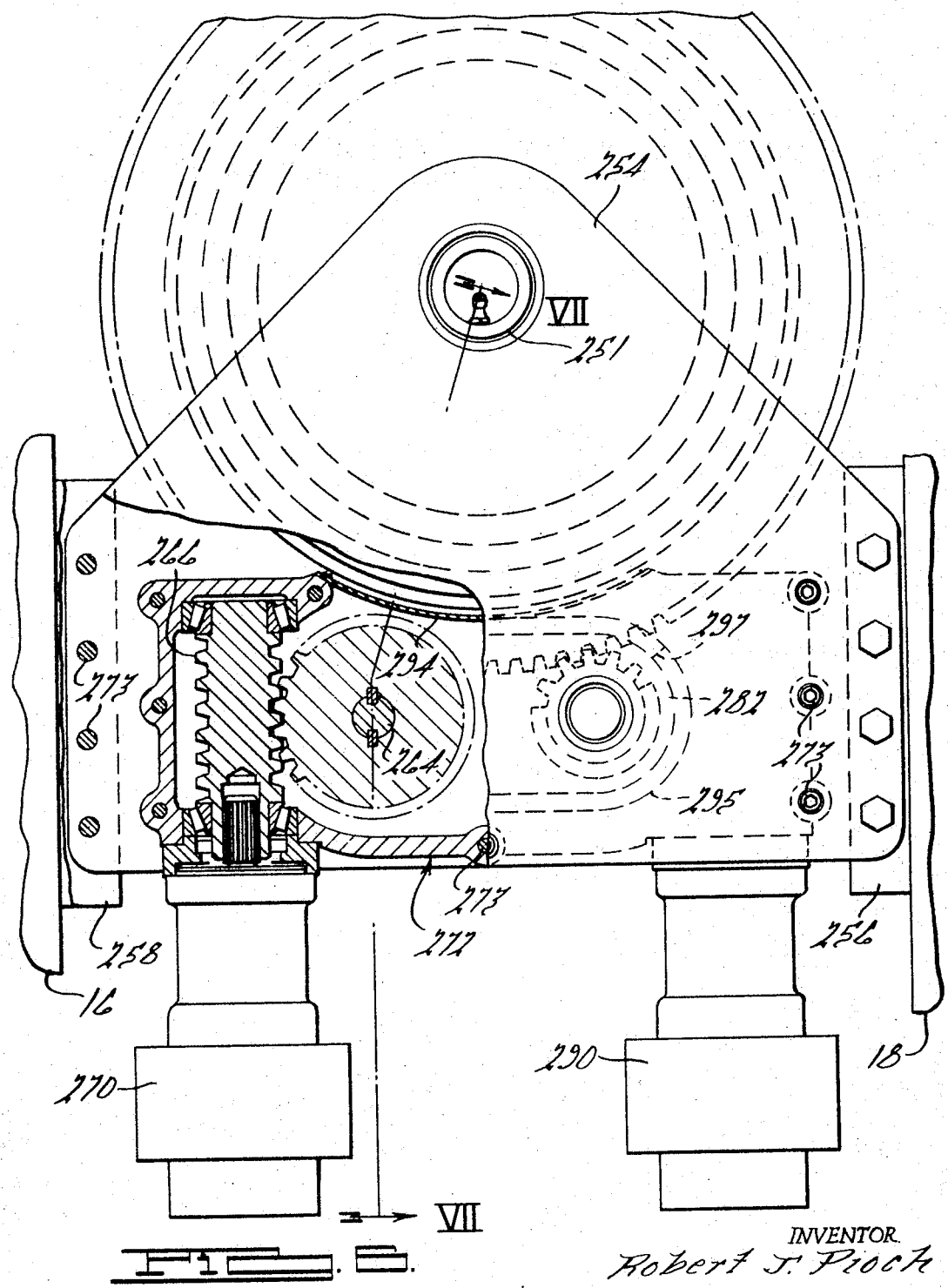

United States Patent Office 3,462,033
Patented Aug. 19, 1969

3,462,033
DUMPING VEHICLE WITH DETACHABLE
BODY MECHANISM
Robert J. Pioch, Jackson, Mich., assignor, by mesne assignments, to Kysor Industrial Corporation, Cadillac, Mich., a corporation of Michigan
Filed Oct. 20, 1966, Ser. No. 588,198
Int. Cl. B66f 9/06
U.S. Cl. 214—505  7 Claims

ABSTRACT OF THE DISCLOSURE

Cargo handling means for tilt-bed vehicles includes a winch drum of large diameter arranged flat between the side rails of the tilt frame with its axis of rotation perpendicular to the plane of the frame. A cable is trained forwardly from the drum to an inclined front pulley having a portion of its groove between and close to one side rail and an opposite portion of the groove above the plane of the side rails. The drum and pulley are large in proportion to the cable diameter without occupying substantial space above the tilt frame. Multiple motors are mounted between the rails. Drive pinions are lubricated from an oil well open on one side but trapping the lubricant when the frame is tilted. The front pulley has a cable takeup motor and a cable clamping roller.

Background of the invention

This invention relates to cargo handling, and particularly to improved mechanisms and installations for the handling of heavy vehicular loads. The invention includes improved means for attaching and detaching removable bodies and other heavy unitary loads with respect to the chassis frames of cargo carrying vehicles.

Many powered and trailer-type vehicles are provided with a tiltable cargo frame, the tilting mechanism being powered by extensible hydraulic cylinder and piston assemblies by means of which the cargo frame is swingable up and down about a transverse axis located at the rear of the vehicle. Such tilting arrangements are used to enable dumping the contents from the body by opening a rear door or tailgate while the body remains attached to the frame, and are also used, in connection with roll-off type bodies, to form a ramp whereby with the aid of a winch or other suitable power means the body or other load can be pulled onto the frame, or lowered down the inclined rampway for unloading. It is frequently desirable to handle in this manner loads of several thousand pounds, so that relatively heavy hoist or lifting means is required in order to pull the body or other load onto the frame, and to control its descent when unloading. Various types of hoisting apparatus have been employed for this purpose including conventional cable winches. In many types of vehicular installations the room available to accommodate the winch and other portions of such a cable type hoisting mechanism is so limited that in heavy duty applications winch units capable of satisfactory operation have not been possible, particularly because a short cable life. The minimum radius at which a cable can be bent without damage is a function of the diameter of the cable. In many cases the vehicle is designed in such manner that when the tilting frame is lowered it lies close to or actually straddles other components such as the transmission, drive shaft and differential of the truck. With presently known designs such components often impose such limitations upon the diameter of the winch drum and/or the front pulley over which the cable is trained, that the diameters of these parts must be too small for the cable, so that in some instances cable life is severely limited, and in other instances the use of a cable winch is not possible. Because such winch mechanisms have important advantages of reliability, simplicity, compactness and light weight, they have frequently been used in cases where the bending radius of the cable is considerably below the optimum, and the resultant repeated short radius of bending of the cable causes premature failure, not only as a direct result of the bending, which stresses the strands beyond their elastic limit, but because the deformation of the cable in this manner, by imparting a permanent set thereto, causes the cable when slackened, as in unloading the body from the rails, to twist and develop kinks, or to become fouled in parts which damage it.

A primary object of the present invention is to overcome the difficulties indicated and to provide an improved cable-type hoist and roll-off mechanism for heavy loads such as displaceable vehicle bodies wherein a winch drum and pulleys of large radius are utilized and the cable is never bent or otherwise stressed in a manner exceeding its elastic limit, or which could cause permanent deformation thereof, and wherein the winch, front pulley and other parts are so designed that when installed in a tilting cargo frame, even under the crowded conditions encountered in difficult truck installations, they do not interfere with the drive components or other structural members of the vehicle.

Other objects and advantages will be apparent upon consideration of the present disclosure in its entirety.

Brief description of the several views of the drawings

In the drawing:
FIGURE 1 is a perspective view of a tractor-truck provided with cargo handling means constructed in accordance with the present invention, showing a portion of a roll-off cargo body;
FIGURE 2 is a plan view of the winch and pulley areas, partly broken away and taken as indicated by the arrow A in FIGURE 1;
FIGURES 3 and 4 are cross sectional views taken substantially as indicated by the lines and arrows III—III and IV—IV respectively, of FIGURE 2;
FIGURE 5 is a schematic diagram of the principal hydraulic components;
FIGURE 6 is a plan view, partly broken away, of a modified winch, and
FIGURE 7 is a sectional view taken substantially on the line VII—VII of FIGURE 6 and looking in the direction of the arrows.

Detailed description of preferred form of the invention

Referring now to the drawing, reference character 10 designates generally a motor vehicle, shown as a truck of a cab-over-engine type. The chassis frame 12 of the truck carries a tiltable cargo frame generally designated 15 which comprises longitudinal side rails 16, 18 rigidly tied together by suitable cross members 19, the cargo frame being swingable upwardly by suitable means such as the hydraulic cylinder and piston assemblies 20 and being pivotally connected to a rear portion of the chassis frame as by pivot means located upon a transverse axis and generally designated 22. When the cargo frame 15 is in the raised position shown in FIGURE 1 the rear extremity of the frame rests on the ground or driving surface so that the cargo frame forms an inclined ramp. Rollers or skids (not shown) may be provided on the container body or other cargo to be carried on the frame, which cargo is represented by the closed container body 25, and the load may then be pulled upwardly onto, or allowed to slide downwardly and off of, the frame.

When the cargo frame 15 is lowered onto the chassis frame 12, it lies flat and in horizontal position directly on the chassis frame. At such time the space available below the cargo frame is severely limited, particularly when the installation is upon a truck of the general character illustrated, wherein the transmission, drive shaft and differential mechanism for delivering power to the rear driving wheels 26 frequently occupy a substantial proportion of the space between the side rails of the chassis frame and lie close to the top of the chassis frame so that if a conventional hoisting winch having a drum rotatable upon a transverse axis is installed in the cargo frame, the winch must be of smaller diameter.

In my improved construction the power is supplied by means of a winch mechanism having a drum assembly, generally designated 30, rotatable upon an axis perpendicular to the general plane of the frame and which is vertical when the frame is in its lowered position. In this description the positions of the parts will be considered as with the cargo frame in the lowered, horizontal position and looking forwardly of the vehicle. As shown in FIGURES 2 and 3, the diameter of the drum is such that it occupies a substantial proportion of the full width of the space between the side rails 16, 18 of the cargo frame. Its axial length is correspondingly short, so that it does not extend downwardly into the space occupied by the drive components of the vehicle, but its diameter is great enough to afford ample cable capacity. The drum assembly is journaled upon a shaft 32 supported in top and bottom plates 33, 34 substantially bridging the upper and lower surfaces of the side rails 16, 18, to which the plates are attached by welded-on channel-type supporting brackets 35. The cable carrying or spool portion 36 of the drum assembly is attached to and rotatable with an upper end disc 38 which is journaled on the shaft 32 as by antifriction bearing means 40. The spool portion 36 is rotatable independently of a lower ratchet wheel-defining disc 42 journaled as by antifriction bearing means 44 upon the shaft 32 below the spool. Additional antifriction bearing means 45 is interposed between the lower axial end of the spool 36 and the ratchet wheel 42.

Means are provided for selectively clutching and releasing the spool 36 with respect to the ratchet wheel 42, such means comprising a plurality of clutch discs 48 keyed to the inner periphery of spool 36 and a plurality of interleaved coacting clutch discs 50 keyed to the outer periphery of a cylindrical inner clutch ring 52. Ring 52 is attached by cap screws 54 to a pressure plate 55 which underlies the clutch discs 48–50, and the clutch plates are overlaid by a clutch backing plate 56 which underlies and reacts against disc 38. The pressure plate 55, ring 52, and clutch discs 48, 50 are axially shiftable during clutching and declutching, in the conventional manner, and the clutch is biased to the engaged condition by a plurality of compression springs 60 trapped beneath pressure plate 55, housed in individual pockets 62 in ratchet wheel 42, and reacting upwardly. Studs 64 held in pressure plate 55 project downwardly into the springs 60 and pockets 62.

The inner surface of ring 52 defines a concentric clutch release cylinder which is slidable over a fixed piston 64. Piston 64 is attached to ratchet wheel 42 by cap screws 65 and partially underlies the pressure plate 55 which projects radially inwardly to form a bottom head for the cylinder. Fluid under pressure is deliverable to the cylinder between the piston and pressure plate 55 from a hydraulic conduit 66 which is connected via a passage 68 in the shaft 32 and a flexible conduit 70 to a passage 72 extending through the piston to the cylinder. When fluid under pressure is delivered to the cylinder via the indicated means, the pressure plate is forced downwardly against the effort to springs 60 to disengage the clutch, and the spool 36 is thereby rendered independently rotatable as is required in paying out the cable.

It will be noted that the shaft 32 is fixed, and is shouldered at the bottom and provided at its top with a nut 74, so that the shaft rigidly ties the supporting plates and the internal parts. The piston 64 is rotatable with and by means of the ratchet wheel 42, and the inner end of hose 70 is connected to the radial upper extremity of passage 68 by means of a manifold ring 75 which is rotatable on the shaft with the piston and internally relieved to maintain constant communication with the passage 68.

The periphery of ratchet wheel 42 is provided with a plurality of substantially radial and clockwise-facing ratchet teeth 80 and is actuable by a pair of piston type ratchet motors 82, 84. The ratchet motors are alike so that detailed description of one will suffice.

Each ratchet motor includes a cylinder assembly 85 having its extended axis disposed substantially tangentially with respect to the ratchet wheel and pivoted near its end remote from the ratchet wheel upon a vertical axis defined by trunnion-type pivot means 86. Within each cylinder is a piston 88 connected to a piston rod 90 projectible toward the orbital path defined by teeth 80 and carrying at its extremity a rigid pawl portion 92. The pivotal mounting of the ratchet motors 82, 84 at the positions 86 permits the entire ratchet motor unit to swing so that its pawl portion can ride up the inclined backs of the ratchet teeth during retraction. The stroke of each unit is such as to rotate the ratchet wheel an angular distance slightly exceeding one-half the angular spacing of the teeth.

As shown in FIGURE 2, in which the pawl 92 of the forward motor unit 82 is shown fully projected and the pawl of the rear unit 84 retracted, the retracting unit, as its pawl clears the radial tooth face, is swung inwardly about its pivot 86 to position its pawl behind the tooth which is next to be powered. An arm 95 is pivoted at 96 to the bottom plate 34 and biased inwardly toward axial shaft 32 by a compression spring 98. Arm 95 has a straight inner edge 100 which lies at an angle to the path of the pawl such that as the pawl is projected to advance the ratchet wheel it moves away from the arm 95 at a relatively gradual angle, and vice-versa. As the pawl retracts and rides up the inclined back of the tooth a pad 102 on the outer side of the pawl engages and slides along the edge 100 during the latter part of the retracting movement, compressing the spring 98. As the pawl clears the back of the tooth the spring pushes it, and the entire ratchet motor unit, inwardly about the pivot 86 far enough to position the pawl behind the tooth, as indicated in the lower portion of FIGURE 2. By virtue of this arrangement, no wear is occasioned and no power is employed in overcoming the spring force until the final portion of the retraction of the pawl.

Each motor unit also carries a valve 105, 108 attached thereto in such position that its actuating roller 106 is engageable by the underside of the pad 102, to shift the stem of the valve inwardly against an internal bias (not shown) as the pad 102 is moved inwardly under the influence of spring 98 in the manner described above.

Referring to the condition in which these parts are shown in FIGURE 2, and although the operation will subsequently be considered in greater detail, the next phase in the operation advances the pawl of the rear ratchet motor 84 to the right, as shown in FIGURE 2, to rotate the ratchet wheel counterclockwise through slightly more than one-half tooth space, and at the same time the pawl of the forward unit 82 is retracted toward the right so that slightly before the rear unit completes its full powered stroke, the forward unit rides back over and drops in behind the next tooth, the valve 105 being actuated at such time. Valve 108 of the rear unit is shifted in the opposite sense by its internal biasing means as the pawl of the rear unit commences its advancing stroke.

It will be recognized that when the clutch mechanism described in connection with FIGURE 3 is engaged, intermittent powering of the ratchet motors 82, 84 in the manner described rotates spool 36 to wind cable 110 onto the spool. By reason of the horizontal disposition of the drum assembly, the run 111 of cable 110 which takes off from the drum assembly in a forward direction, lies close to the left rail 16 of the cargo frame. At its forward extremity the cable is trained over a pulley 120 which is also of large diameter and is carried by and near the front of the cargo frame. As best shown in FIGURE 4, pulley 120 is journaled upon a shaft 122 fixedly supported in a pair of spaced, parallel, angularly disposed mounting plates 123, 124. The plates, 123, 124 and pulley 120 are so positioned that at its lowermost point the periphery of the pulley 120 lies close to the inner wall of side rail 16, while the diameter and inclination of the pulley are such that its highest point, corresponding to the position where the rearwardly extending run 112 of the cable leaves the pulley, lies substantially midway between and is spaced somewhat above the side rails 16, 18. Thus the rearward run 112 is conveniently positioned to extend over the cross members and drum assembly for connection to the body 25 or other cargo. With most vehicle constructions the pulley may lie at a relatively low angle to the horizontal, being about 30° in the installation depicted herein, and by virtue of this arrangement the diameter of the pulley 120, may be large and may in fact exceed one-half the distance between the side rails. The pulley supporting plates 23, 24 are rigidly carried by suitable frame plates and bracing members as 126, 128, 129 attached to side rails 16, 18. The fact that the cable run 111 from the winch to the pulley lies close to one side rail and allows the use of a tilted pulley permits the pulley to be much larger than is possible with conventional arrangements wherein both the pulley and winch turn on horizontal axes and the cable runs are substantially centered in the frame.

An idler pulley 130 assures retention and gripping of the cable with respect to the pulley 120, is journaled in an adjustable-pressure bracket arm structure 131, and has a resilient tread portion bearing radially inwardly against the outer cable surface at the high point of the main pulley 120 with sufficient force to provide a positive drive between the cable and pulley. Pulley 120 is drivable by a motor 133 having a driving pinion 134 meshing with a gear 135 secured into one side of the pulley. The motor 133 is hydraulic and is powered in a direction to tend to pay out the cable and to maintain tension thereon, thereby opposing uneven winding.

My preferred actuating and control system is shown in FIGURE 5. A pump 140 delivers hydraulic fluid from a reservoir 142 to a main supply line 143 connected to a three-position manual control valve 144. When valve 144 is in the centered position shown the fluid supply to the winch ratchet motors 82, 84 and to the cable payout motor 133 is cut off and the pump delivers fluid pressure via a branch conduit 148 to a pressure relief valve 149 set, for example, at 1500 p.s.i., and back to the reservoir, as well as to any other desired hydraulically powered apparatus on the vehicle. When valve 144 is moved left, to the "up" position, line 145 delivers hydraulic fluid through a check valve 150 and thence through an oscillatory automatic air-operated three-position valve 152 which sequentially energizes the ratchet motors.

Assuming the winch is started by moving the control valve to the "up" position with the other parts as shown, the piston 88 of motor 84 is thereby projected to turn the ratchet wheel and the spool in a direction to take up the cable, as previously indicated. As the piston rod and pawl of motor 84 move outwardly, biasing means 109 of valve 108 moves valve 108 in a direction to disconnect the actuating air cylinder 160 at the left end of valve 152 from the air supply line 166 and vent the cylinder, but valve 152 stands in the same position because its opposite actuating cylinder 158 is also vented. Line 166 may be supplied with air under pressure from the air pressure supply system of the truck or other suitable source. The oil displaced from the front or rod end of cylinder 84 by the piston 88 when moving outwardly is transmitted through a transfer line 151 to the space in front of the piston in the cylinder 82 to cause retraction of the pawl of such motor as the pawl of motor 84 is projected. Preferably a constant supply of oil at sufficient pressure to retract the projected piston and to make up any loss is supplied to line 151 and the rod ends of the cylinders from line 145 and pressure compensated flow control valve 181 and line 183. This may supply a relatively low quantity and low pressure for the indicated purpose (e.g.: 3 g.p.m. at 150 p.s.i.) without in any way burdening such an installation on a truck inasmuch as more than ample pressure and volume will be available. Excess oil in the transfer line 151 escapes to the reservoir via pressure-regulating exhaust valve 177 and return line 179.

After the piston and pawl of ratchet motor 82 have completed their retraction, and as soon as the ratchet wheel has been turned far enough by motor 84 so the radial tooth face clears the pawl, motor 82 and its pawl swing inwardly toward the axis of the ratchet wheel, as described above, thereby shifting the air valve 105 downwardly, as shown in FIGURE 5, and thereby in turn supplying air under pressure to actuating air cylinder 158 to shift valve 152 to the left.

As valve 152 passes through an intermediate position the central section 153 thereof connects hydraulic line 145 from the main hydraulic supply both to the line 147 leading to the space behind the piston in ratchet motor 84, and to the line 167 leading to the space behind the piston in ratchet motor 82, thereby momentarily powering both ratchet motors and taking up all clearance between the pawls and the ratchet teeth.

The valve 152 then continues its movement to the left and when its section shown at the right reaches the leftward extremity of its movement, establishes a reverse connection of lines 147–167 so that the supply line 145 is then connected to the line 167 leading to motor 82 and the line 147 is connected to reservoir 142 via exhaust lines 168, 179. Movement of the piston of motor 82 away from retracted position causes valve 105 to shift, to vent cylinder 158 so that when valve 108 shifts to again connect cylinder 160 to air supply line 166, valve 152 is thereby returned to the right hand position to again reverse the actuation of the ratchet motors. Alternate actuation of the ratchet motors 82 and 84 continues in the indicated fashion as long as the main control valve 144 is in its leftward or "up" position, thereby turning the drum assembly in a winding direction.

It will be seen that as long as manual valve 144 is in the up position the conduit 146 leading to the clutch release cylinder 52 and payout motor 133 is exhausted to the reservoir. When the valve 144 is moved all the way to the right, to the "down" position, the connections between the lines 145, 146 and the power supply line 143 and reservoir 142 are reversed. Line 145 is then exhausted to the reservoir, so that no power is delivered to either ratchet motor, and hydraulic fluid under pressure is delivered to conduit 146 which is connected to conduit 66 leading to the clutch cylinder. The clutch is thus released, permitting the cable to be payed out. Conduit 146 is also connected to the fluid motor 133, which is thereby energized to rotate the pulleys 120, 130 and pay out the cable if the load is not sufficient to draw it out, as indicated.

When the body or other load is being lowered, the delivery of fluid to the clutch release cylinder can be throttled by the manual valve 144 so as to control the rate of descent. The ratchet wheel is always held against reverse rotation by whichever pawl is fully retracted, and the clutch may accordingly be employed as a brake to effectively regulate the rate of descent.

In the modified construction shown in FIGURES 6 and 7, the spool portion 250 of the drum assembly is journaled in smooth bearings 251, 252 in the upper and lower mounting plates 254, 255 which are secured as by bolting to mounting blocks 256, 258 attached to the tilt frame side rails 16, 18 and positioned so that the upper and lower surfaces of the supporting plates 254, 255 are flush with the upper and lower surfaces of the side rails respectively and the general positioning of the winch corresponds to that of the first embodiment.

Attached to and extending peripherally from the upper side web of the spool 250 is a ring gear 260. The ring gear is drivable by two pinions 262, 282 meshing therewith at peripherally spaced positions. Pinion 262 is fast upon a downwardly extending shaft portion 264 journaled in a housing generally designated 272 formed as a casting which is secured between and extends transversely of the top and bottom plates 254, 255 to which it is secured as by screws 273. A worm wheel 265 is fast upon a lower portion of shaft 264 and meshes with a worm 266 drivable by a motor 270. A hub portion 263 extending upwardly from the gear 262 is journaled in a bearing 268 in the top plate 254. The other pinion, 282, is similarly mounted and driven by a motor 290, worm and worm wheel (not shown) and the parts of the two driving assemblies are alike so that description of one will suffice.

Housing 272 has a bottom web 274 lying flat against the top of plate 255 and a central horizontal web 275 which projects forwardly beneath the pinions in a position above the worm wheels. The shaft portions as 264, extend vertically through the central web 275 parallel to each other and to the winch axis and perpendicular to plates 254, 255, the shaft portions being journaled in center and bottom bearings as 276, 277 mounted in the webs 275, 274 respectively.

As indicated in FIGURE 7, the positioning of the housing 272 is aided by boss portions as 291 concentric with and projecting downwardly from the areas of the housing which support the bottom shaft bearings as 277 and located in suitably positioned holes in the bottom plate 255.

The motors 270 and 290 are preferably hydraulic motors and are supported by the back wall of the housing 272. As brought out in FIGURE 6, the direct-driven worms are positioned upon the opposite outer sides of their respective worm wheels 265, 285. The worms are preferably of double helix form, which permits the use of a relatively high helix angle. This is made possible with motors compact enough to lie between the top and bottom surfaces of the side rails, by the multiple driving arrangement. The worms are identical (e.g.: both right hand helix) and the motors are so connected to their driving means as always to run in opposite directions. Thus, all gear and motor parts may be identical.

The lower section of the casing below the central web 275 is fully enclosed. The back wall 292 of the lower section of the casing is integral with the horizontal webs 274, 275. The front wall of the lower section is formed by a removable plate 294 arcuately curved concentrically with and lying relatively close to the periphery of the spool. The upper section of the casing, above the web 275, is open on its forward side throughout a peripheral extent great enough to admit the ring gear 260 for meshing engagement with the pinions 262, 282. Except for such open area, the upper section is also an enclosed compartment containing the two pinions 262, 282, the rear and side walls of such compartment being formed by an upwardly extending flange wall 295 integral with the housing and with the medial web 275 while the opening for admission of the ring gear 260 is formed by a front wall portion 296 forming an integral continuation of the wall 295 but of reduced vertical height. The higher side and rear wall portions 295 extend upwardly to juncture with the bottom of top plate 254, and the junctures of such higher portion with the lower front portion 296 from vertical shoulder walls 297 lying close to the ring gear so that the ring gear itself substantially closes the open front area of the upper compartment.

The wall portions 295, 296 enclose the pinions and the space there between relatively closely and define an oil retaining pocket designated 300. The pocket 300 is charged substantially to the level of the top of its front wall portion 296 with a fluid lubricant of relatively high viscosity but which will flow under gravity at a rate sufficient so that when the tilting frame is raised the lubricant remains substantially level and the pinions 262, 282 accordingly partially submerge their rear teeth in the lubricant as the frame tips. Such tipping raises the portion shown at the left of FIGURE 7 with relation to the portion at the right, and the oil is retained in engagement with the pinion teeth by the back wall portions 295 and lubricates the pinions 262, 282 and thereby the ring gear 260. In installations of the nature herein contemplated, the winch is always operated with the frame tilted, so that effective lubrication of the pinion and ring gear is assured as long as the rear or portion corresponding to that shown at the right is materially lower than the portion shown at the left.

In this embodiment the end of the cable 310 is suitably secured with respect to the spool as by the U-bolt 311, and may be trained forwardly along and close to one side rail of the tilt frame, over a front pulley corresponding to the one previously described and as illustrated in FIGURE 4, and thence rearwardly for connection to the load.

A payout and cable tensioning motor corresponding to the motor 133 is also preferably employed to keep the cable taut and prevent fouling. The use of a plurality of driving motors reduces the gear loading, particularly at the pinions and ring gear, and permits the use of a narrower ring gear thereby increasing the cable capacity of the winch in proportion to its axial thickness. The hydraulic motors are powered from a common supply and the load is therefore balanced between them and tooth loading is uniform.

With the relatively high pitch worm teeth which can be employed in most applications of the invention the mechanism may not be self-locking, but since the hydraulic motors are of the positive displacement type, the winch is positively locked in position when the exhaust lines from the motors are closed. The directions of drive of both motors are reversed simultaneously to reverse the winch, and the rate of descent as well as of lifting of the winch load is controllable simply by controlling the fluid flow, so that no clutch or brake is required.

This Detailed Description of Preferred Form of the Invention, and the accompanying drawings, have been furnished in compliance with the statutory requirement to set forth the best mode contemplated by the inventor of carrying out the invention. The prior portions consisting of the Abstract of the Disclosure and the Background of the Invention are furnished without prejudice in an effort to comply with administrative requirements of the Patent Office.

What is claimed is:

1. In combination with a tiltable vehicle frame mounted longitudinally on a vehicle for tilting on a transverse axis and having spaced generally parallel side rails, a top cross member carried by the rails and substantially bridging the space between the tops of said rails, a bottom cross member carried by the rails and substantially bridging the space between the bottoms of said rails, the novelty which comprises the combination of winch means carried by the frame intermediate the ends thereof including a winding drum journaled in and located between said cross members and rails and rotatable upon an axis perpendicular both to the cross members and to the rails, motor means supported from the rails for driving the drum, a pulley also carried by the rails at a position spaced longitudinally forwardly from the drum, the diameter of said pulley being a substantial proportion of the distance between said rails, the pulley being rotatable upon an axis which is also transverse with respect both to the rails and to said cross members, and a cable anchored and wound about the drum, trained forwardly therefrom to and around the pulley and then rearwardly over the cross members to the rear of the frame.

2. In combination with a vehicle frame having spaced generally parallel side rails, a top cross member carried by the rails and substantially bridging the space between the tops of said rails, a bottom cross member carried by the rails and substantially bridging the space between the bottoms of said rails, and winch means carried by the frame including a winding drum located between said cross members and rails and rotatable upon an axis perpendicular to both, motor means for driving said drum also carried by, and located between said rails, the motor means including a cylinder and piston-type power unit including a piston rod and a pawl actuatable by the rod to turn the drum, the power unit, including the rod and pawl, being bodily swingable upon an axis parallel to said first mentioned axis.

3. In combination with a vehicle frame having spaced generally parallel side rails, a top cross member carried by the rails and substantially bridging the space between the tops of said rails, a bottom cross member carried by the rails and substantially bridging the space between the bottoms of said rails and winch means carried by the frame including a winding drum located between said cross members and rails and rotatable upon an axis perpendicular to both, a ratchet wheel concentric with the drum and also located between said cross members and rails, and means for turning the ratchet wheel including a reciprocatory pawl and a motor unit also carried by the rails, a clutch and clutch actuating means for selectively making and breaking a driving connection between the ratchet wheel and drum, both the clutch and clutch actuating means being housed within said drum.

4. In combination with a vehicle frame having spaced generally parallel side rails, a top cross member carried by the rails and substantially bridging the space between the tops of said rails, a bottom cross member carried by the rails and substantially bridging the space between the bottoms of said rails, and winch means carried by the frame including a winding drum located between said cross members and rails and rotatable upon an axis perpendicular to both, a pulley also carried by said rails at a position longitudinally spaced from the drum and over which a cable connected to the drum is adapted to be trained, the diameter of said pulley being a substantial proportion of the distance between said rails, the pulley being rotatable upon an axis which is also transverse with respect both to the rails and to said cross members but tilted laterally to position a low point of the periphery of the pulley adjacent one of the rails in the space between the rails and a high point of the pulley above the rails.

5. In combination with a vehicle frame having spaced side rails, winch means carried by the frame including a winding drum rotatable upon an axis substantially perpendicular to the plane of the frame, means for controllably driving the drum including a ratchet wheel concentric with the drum axis, a pair of pawls reciprocable in paths non-radially intersecting the ratchet wheel to rotate the latter, a pair of motor means, one for reciprocating each pawl, means for simultaneously energizing said motors in directions to reciprocate said pawls in opposite angular directions relatively to the ratchet wheel, means for intermittently reversing the directions of actuation of said motors, and means for momentarily energizing said motors in the same angular direction prior to reversals thereof.

6. In combination with a vehicle frame having spaced generally parallel side rails, a top cross member carried by the rails and substantially bridging the space between the tops of said rails, a bottom cross member carried by the rails and substantially bridging the space between the bottoms of said rails, and winch means carried by the frame including a winding drum located between said cross members and rails and rotatable upon an axis perpendicular to both, the frame being tiltable, a ring gear carried by the drum, a driving gear meshing with the ring gear for turning the drum, a casing at least partially enclosing the driving gear and having an opening through and from which the ring gear extends, said casing having a lubricant well below and extending axially away from the driving gear in one direction and extending around and relatively close to the toothed face of said driving gear in a direction away from its meshing engagement with the ring gear, whereby when the frame is tilted in a direction to elevate the ring gear with respect to the driving gear, lubricant in the well will flow from a position below the axial end of the driving gear to the toothed area of the driving gear.

7. A combination as defined in claim 1 wherein the axis of the pulley lies in a plane perpendicular to both rails and at an angle of less than 90° to the plane of the cross members, the portion of the pulley groove closest to one rail lying below the top cross member and the remainder of the pulley groove extending angularly upwardly for a higher laterally spaced position at its opposite side to conduct the cable to a position to extend over the tops of the cross members.

References Cited
UNITED STATES PATENTS

| | | | |
|---|---|---|---|
| 2,685,377 | 8/1954 | Auger. | |
| 2,788,905 | 4/1957 | Grove. | |
| 2,947,187 | 8/1960 | Graff et al. | |
| 3,034,674 | 5/1962 | Bertoglio et al. | 214—517 |
| 3,224,735 | 12/1965 | Linde | 254—186 XR |

ALBERT J. MAKAY, Primary Examiner

U.S. Cl. X.R.

74—128; 214—85.5; 242—85; 254—166